(12) United States Patent
Gerber et al.

(10) Patent No.: US 7,162,478 B2
(45) Date of Patent: Jan. 9, 2007

(54) SYSTEM AND METHOD FOR CORRELATED FRAGMENTATIONS IN DATABASES

(75) Inventors: Robert Gerber, Portland, OR (US); Paul S. Taylor, Redwood City, CA (US)

(73) Assignee: International Business Machines Corporation, Armonk, NY (US)

( * ) Notice: Subject to any disclaimer, the term of this patent is extended or adjusted under 35 U.S.C. 154(b) by 980 days.

(21) Appl. No.: 09/796,928

(22) Filed: Feb. 28, 2001

(65) Prior Publication Data
US 2002/0194149 A1    Dec. 19, 2002

(51) Int. Cl.
G06F 17/30 (2006.01)
(52) U.S. Cl. .......................................... 707/100; 707/8
(58) Field of Classification Search ............. 707/1–10, 707/100–104.1, 200–205
See application file for complete search history.

(56) References Cited

U.S. PATENT DOCUMENTS 5,133,068 A * 7/1992 Crus et al. ................. 707/100
5,553,218 A * 9/1996 Li et al. ...................... 707/102
5,924,094 A * 7/1999 Sutter .......................... 707/10
6,226,650 B1 * 5/2001 Mahajan et al. ............ 707/201

OTHER PUBLICATIONS

Kulkarni et al, "Using semantic knowledge of partitioning and allocation of data in distributed databases", vol. ii, Jan. 8-11, 1991, pp. 146-154.*

* cited by examiner

Primary Examiner—Mohammad Ali
(74) Attorney, Agent, or Firm—Prentiss W. Johnson; Michael J. Buchenhorner

(57) ABSTRACT

Apparatus and methods to identify a home fragment for a child row of a child table of a database, the home fragment for a row being the fragment in which the row is stored. A child key value of the child row is obtained and used to identify a fragment of a parent table that is correlated with the child key value of the child row. The child key value being the value of a child key attribute of the child row and represents a reference to a parent row in a parent table. The result is the home fragment for the child row that corresponds to identified fragment of a parent table that is correlated with the child key value of the child row.

3 Claims, 9 Drawing Sheets

SYSTEM AND METHOD FOR CORRELATED FRAGMENTATIONS IN DATABASES

BACKGROUND

The present invention relates generally to data fragmentation (partitioning) in database systems, and more particularly to methods and apparatus for creating and using what will be called correlated fragmentation in relational databases.

A database is a collection of information. A relational database is a database that is perceived by its users as a collection of tables. Each table arranges items and attributes of the items in rows and columns, respectively. Each table row corresponds to an item (also referred to as a record or tuple), and each table column corresponds to an attribute of the item (referred to as a field or, more correctly, as an attribute type or field type). A key is a set of one or more columns of a record from a table wherein those column value(s) can be used to identify one or more records in a table.

A "primary key" for a table is a simple or composite attribute that uniquely identifies rows of the table. A key must be inherently unique, and not merely unique at a particular point in time. It is possible, but not typical, to have a table where the only unique identifier is the composite attribute consisting of all the attributes of the table. It is also possible, but not typical, for a table to have more than one unique identifier. In such a case, the table may be said to have multiple candidate keys, one of which could be chosen and designated as the primary key; the remaining candidates then would be said to be "alternate keys". Collectively, primary and alternate keys may be referred to as "unique" keys. Primary and alternate keys must satisfy two time-independent properties. First, at no time may two rows of the table have the same value for the key. And second, if the key is composite, then no component of the key can be eliminated without destroying the uniqueness property A "foreign key" is a possibly composite attribute of a table whose values are required to match those of the primary key of some table, which is typically but not necessarily distinct from the table for which the foreign key is defined. A foreign key value represents a reference to the row containing the matching primary key value, which may be called the referenced row or the target row. The table that contains the foreign key may be A "referential integrity" rule requires a database system to maintain "referential integrity" between foreign keys and primary keys. The rule states that a database must not contain any unmatched foreign key values. An unmatched foreign key value is a non-null foreign key value for which there does not exist a matching value of the primary key in the relevant target table. Note that referential integrity requires foreign keys to match primary keys. A database system is not required to maintain integrity with respect to alternate keys.

Fragmentation is a technique used to increase database performance. Horizontal fragmentation breaks a table into horizontal pieces (groups of rows) called fragments. The rules assigning a row to a fragment are defined by a database user or administrator and are part of a "fragmentation scheme". It is possible for a fragment of a given table to be empty if none of the rows of the table satisfy the fragmentation scheme's assignment rules for that fragment.

A "scan" is a process of reading one or more fragments of a table. A scan is accomplished by the actions of one or more scan operators. Fragments may be stored independently on separate disks or on separate nodes in a computer cluster or network architecture. Logically, all fragments may be scanned simultaneously, thereby increasing the overall rate at which the complete table can be read, subject to the limitations of the physical storage of the data. A scan operator is able to read more than one fragment, but not simultaneously. To read more than one fragment simultaneously, a database system must use multiple scan operators.

"Fragment elimination" is a process by which a database system identifies fragments from a table that cannot participate in the result of a query and removes those fragments from consideration in processing the query.

SUMMARY

In this specification, the terms "parent key" and "child key" will be used to refer to a matching relationship between two keys of two tables. More specifically, the term parent key will be used to indicate a key of a parent table that is referenced by the value of a child key of a child table. A specific kind of parent key and child key is the primary key and foreign key of a primary table and a foreign table. However, the definition of a parent key does not include the requirements of existence and uniqueness that are part of the definition of a primary key.

In this specification, the term "fragmentation key" will be used to refer to a key that is referenced by a fragmentation definition of a table, which will be described later. In this specification, unless stated otherwise, a parent key is a fragmentation key that is the subject of a fragmentation definition of a parent table, and a child key is a fragmentation key that is the subject of a fragmentation definition of a child table.

In one aspect relating to a relational database system, a computer-implemented method identifies a home fragment for a child row of a child table of a database, the home fragment for a row being the fragment in which the row is stored. The method includes obtaining a child key value of the child row and using the child key value to identify a fragment of a parent table that is correlated with the child key value of the child row, the child key value being the value of a child key attribute of the child row, the child key value representing a reference to a parent row in a parent table; and identifying the home fragment for the child row that corresponds to identified fragment of a parent table that is correlated with the child key value of the child row.

Implementations of the aspect may include one or more of the following. The child key can refer to a parent key that is used in the fragmentation definition of the parent table; a parent fragment identifier can be derived from the value of the parent key; and a home fragment identifier for the child row can be correlated with the derived fragment identifier of the parent table. The child key can be used to identify information about a row of the parent table containing a parent key corresponding to the child key by using the parent row information to obtain a parent fragment identifier; and using the parent fragment identifier to obtain a home fragment identifier for the home fragment for the child row. The child key can be used to obtain a parent row containing a parent key corresponding to the child key by using the parent row to obtain a parent fragment identifier; and using the parent fragment identifier to obtain a home fragment identifier for the home fragment for the child row. The parent fragment identifier can be used to obtain a home fragment identifier for the child row by performing a calculation on the parent fragment identifier, the result of which calculation is the home fragment identifier. The result of the calculation can be a number or text. The parent key can, but need not be a unique key of the parent table, the unique key being a simple or composite attribute of a table having at all times the property that no two rows of the table have the same value for the attribute and the property that if the attribute is composite then no component of the attribute can be eliminated without destroying the uniqueness property. The child key may be a foreign key of the child table and the parent key may be a primary key of the parent table, and the database system may maintain referential integrity on the primary key and foreign key values, the referential integrity ensuring that the database contains no unmatched foreign key values. The parent table can be fragmented into p_size fragments and the child table is fragmented into c_size fragments, p_size and c_size being integers greater than one, where if p_size equals or exceeds c_size, the method can calculate a child table fragment identifier as a function of the parent fragment identifier; and if c_size exceeds p_size, the method can identify a set of candidate home fragment identifiers based on the parent fragment identifier, and apply a computational process to the set of candidate home fragment identifiers to select one of the candidate home fragments as the home fragment for the child row. The computational process can implement a key value method, where the child key value of the child row is mapped to a fragment number of the child table by a predefined mapping function. The child key value can also be hashed to a hash value, and the hash value modulo the number of candidate home fragments are mapped one-to-one to candidate home fragment identifiers. The computational process can implement a round robin method in which the least recently used candidate home fragment is used for new row insertion. The computational process can also implement a random-number method using a computational random number generator or a set of random numbers to select one of the candidate home fragments as the home fragment for the child row. Each parent table fragment identifier can be one of p_size integers; and each child table fragment identifier can be one of c_size integers.

In another aspect relating to a relational database system, a computer-implemented method identifies a home fragment for a child row of a child table of a database, the home fragment for a row being the fragment in which the row is stored. The method includes obtaining a child key value of the child row and using the child key value to identify a fragment of a parent table that is correlated with the child key value of the child row, the child key value being the value of a child key attribute of the child row, the child key value representing a reference to a parent row in a parent table; and identifying the home fragment for the child row that corresponds to the identified fragment of a parent table that is correlated with the child key value of the child row even when referential integrity is not being maintained by the database system between the parent table and the child table, and wherein a parent table row referenced by a child key value may not exist.

Another aspect relates to a computer-implemented method for creating a correlated fragmentation scheme for a relational database by establishing a parent fragment identifier for each parent fragment of a parent table; establishing a child fragment identifier for each child fragment of a child table, the child table having a child key referencing a parent key of the parent table; and establishing a definition relating each parent fragment to one or more corresponding child fragments, whereby a child row can be assigned to a specific fragment of a child table corresponding to the parent fragment that corresponds to the child key of the child row.

Implementations of the aspect may include one or more of the following. The parent key can be a primary key and the child key is a foreign key. The parent table and the child table should be distinct tables.

In another aspect for a relational database system managing a relational database having a correlated fragmentation scheme containing a fragmented parent table and a fragmented child table, a method optimizes the maintenance of referential integrity between parent rows in a parent table and the child rows of a child table by identifying a subset of the fragments of the parent and child tables that have to be examined during the maintenance of referential integrity.

Implementations of the aspect may include one or more of the following. The number of parent fragments to be examined can be reduced by using a correlated fragmentation scheme to identify a subset of the fragments of the parent table that have to be examined to determine whether a parent row exists that corresponds to a new or updated foreign key of a child row in a child table when referential integrity is required to be maintained between a parent table and child table. The number of child fragments to be examined can be reduced by using a correlated fragmentation scheme to identify a subset of the fragments of the child table that have to be examined to determine whether a child row exists that corresponds to an updated or deleted primary key of a parent row of a parent table when referential integrity is required to be maintained between a parent table and child table.

In another aspect, a method eliminates fragments in the evaluation of a query predicate on a fragmented child table in a relational database by establishing a correlated fragmentation scheme using a key to define a M:N relationship between M fragments of a fragmented parent table and N fragments of the child table, the key being a child key for the child table and a parent key for the parent table, a child key value representing a reference to a parent row in the parent table; obtaining a set of child key values for the child key satisfying the query predicate; using the set of child key values to identify a set of parent table fragments, the set of parent table fragments being all the fragments of the parent table having a row that is referenced by any of the set of child key values; and using the identified set of parent table fragments and the correlated fragmentation scheme to identify a set of child table fragments to be scanned.

Implementations of the aspect may include one or more of the following. The set of child key values can be used to identify a set of parent table fragments by identifying rows in the parent table whose parent key values are in the set of child key values and identifying the parent table fragments from the parent table rows. The set of child key values can also be used to identify a set of parent table fragments by obtaining parent table fragment identifiers directly from the child key values. The child key can be a foreign key and the parent key can be a primary key. The set of child key values can be a range of values. The parent table fragment identifiers can be obtained by computing a parent fragment identifier from a parent key value. The parent table fragment identifiers can be obtained by obtaining a parent fragment identifier from a parent key value that is a primary key value. The parent table can be fragmented into p_size fragments and the child table is fragmented into c_size fragments, p_size and c_size being integers greater than one, each fragment having a fragment identifier. The identifying of a set of child table fragments to be scanned includes: if p_size equals or exceeds c_size, calculating a child table fragment identifier as a function of the parent fragment identifier for each parent fragment in the set of parent fragments; and if c_size exceeds p_size, identifying the combination of all the child table fragment identifiers corresponding to each of the set of parent fragment identifiers as the set of child table fragments to be scanned.

In another aspect, a method eliminates fragments in the evaluation of a query that references both a parent and a child table in a relational database by establishing a correlated fragmentation scheme using a key to define a M:N relationship between M fragments of a fragmented parent table and N fragments of the child table, the key being a child key for the child table and a parent key for the parent table, a child key value representing a reference to a parent row in the parent table; obtaining a set of child key values for the child key satisfying the query predicate; using the set of child key values to identify a set of parent table fragments, the set of parent table fragments being all the fragments of the parent table having a row that is referenced by any of the set of child rows qualified by the query predicate on the child table; and using any predicate or other qualifier on the parent table to further reduce the set of parent table fragment identifiers through the process of fragment elimination; and using the identified set of parent table fragments and the correlated fragmentation scheme to identify a set of child table fragments to be scanned; and using the identified set of parent table fragments as the basis for a scan of the parent table.

Implementations of the aspect may include one or more of the following. The method does not require that a predicate exist on the joining attribute between the child and parent tables. The database system can store every fragment of the child table on a storage unit separate from the storage unit on which database system stores every other fragment of the child table. The database system operates to provide a set of scan processes to read the child table, each scan process operating to read a fragment of the child table in parallel with every other scan process of the set of scan processes with respect the storage units on which the child table fragments are stored. Each storage unit is part of a data storage subsystem that can be operated in parallel with each other data storage subsystem comprising one of the other storage units on which child table fragments are stored. The database system operates to provide a set of scan processes to read the parent table, each scan process operating to read a fragment of the parent table in parallel with every other scan process of the set of scan processes with respect to the storage units on which the parent table fragments are stored. The fragmentation of the parent table need not include the parent key. The placement of the data in the parent table can be on the same or different disks or storage units from fragments in the child table.

Among the advantages of the invention are one or more of the following.

With correlated fragmentation, fragment elimination on a table A can generally be propagated across a join to a table B, even when a predicate does not exist on the join attribute for table A and vice-versa. In this way, a large reduction in the amount of data scanned during join operations can be achieved. The fragment elimination works in both directions across a join predicate when the tables being joined are related through correlated fragmentation.

Operation of the invention does not interfere with other methods that reduce the amount of data scanned during single table scan operations. Rows from child and parent tables can be assigned to separate disks or storage units to guarantee that true parallelism in scan processing can occur. The placement of row contents for any given key can be designed to be on different disks or storage units to reduce the likelihood that concurrent users or processes making reference to different key values will create bottlenecks on the same physical storage resources. The placement of parent and child rows can be designed to be on the same node, to guarantee that all joins between the two tables are local joins. The use of local joins contributes to performance and scalability of a database system and database because no inter-node message traffic is required to perform a local join operation.

Another advantage is that use of correlated fragmentation based on a primary key can simplify the enforcement of referential integrity in certain circumstances. That is, when either a foreign or primary key is updated, correlated fragmentation can reduce the percentage of the corresponding table that needs to be considered when determining whether such an update will be permitted. For example, when a foreign key is updated in a child table, the database system can determine exactly what fragment or fragments of the parent table must be referenced to determine whether a corresponding row of the parent table exists with the new value of the foreign key.

Another advantage is that physical database design can be simplified for child tables containing foreign keys or other child keys referencing a parent table. Correlated fragmentation permits the fragmentation scheme for a child table to correspond to the fragmentation of a parent table even when the parent table is fragmented based on a parent key other than the primary key. Also, correlated fragmentation simplifies the physical fragmentation design of the child table even when the parent table is fragmented on the primary key because a user does not have to ensure that the fragmentation scheme applied to the foreign key of the child table is an exact replica of the fragmentation scheme applied to the primary key of the parent table. This is advantageous at database definition time and over time as database physical designs are changed and maintained.

Other features and advantages of the invention will become apparent from the following description and from the claims.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
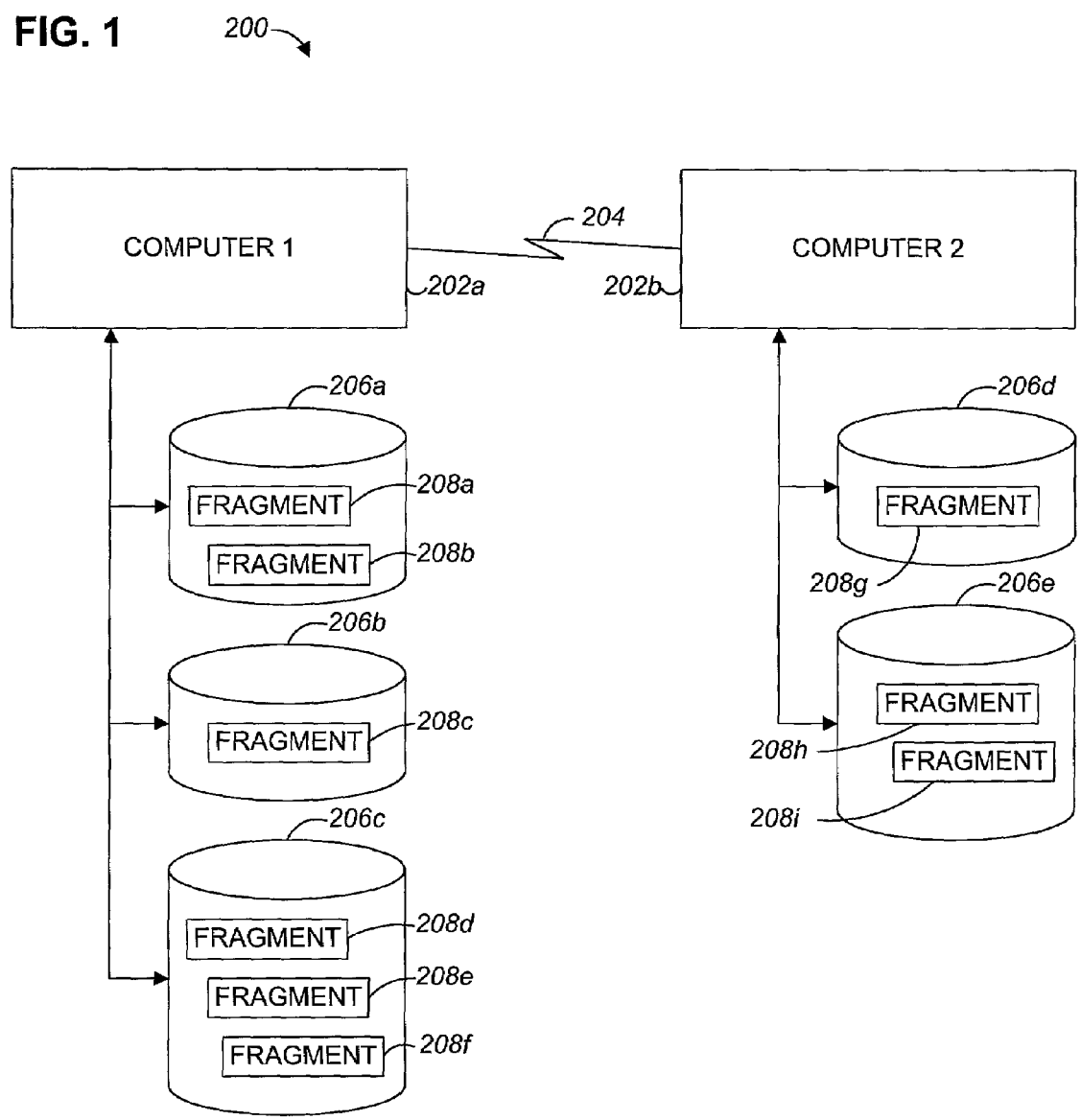
FIG. 1 is a block diagram of a computer system platform suitable for implementing an embodiment of a database system in accordance with the present invention.

FIG. 1 illustrates a computer system 200 that is a suitable platform for supporting a relational database system and storing relational database tables, which will be referred to simply as tables. The computer system 200 includes one or more computers 202 (individually, computers 202a and 202b). Multiple computers may be connected by a link 204, which may be high-speed backbone that creates a cluster of computers, or a local or wide-area network connection linking the computers. The computers have one or more persistent data stores 206a–206e. Typically, each database storage is a storage subsystem including one or more disk drives that operate independently of the disk drives of every other data storage which are controlled through disk controllers installed in the associated computer and operated under the ultimate control of the database system.

In the database system that will be described and used for illustrative purposes, a database definition initially resides in one database storage space in which the database is placed by operation of a "create database" command to the database system. A database initially includes a set of relational tables called the system catalogs (not shown). The system catalogs describe all aspects of the database, including the definitions of all tables and the fragmentation of all tables. As new tables are created, with "create table" commands, for example, new data is added to the system catalogs to describe the new tables.

The system catalogs include a system fragments table for persistently storing information about the fragmentation of the database. Each fragment may be represented by an individual row in the system fragments table. When the system needs to refer to fragments, it can run queries against the system fragments table to obtain the necessary fragmentation information for any given table. One attribute of the system fragments table is the fragmentation method: a table that is fragmented using a correlated fragmentation scheme, described later in this specification, will have an attribute value such as "correlated" that identifies the fragment as one that was created with a correlated fragmentation scheme. The correlated child and parent key information that is used by a correlated fragmentation scheme is also stored in a table in the system catalogs.

Each data store may store one or more fragments 208a–208i of one or more tables managed by the database system. It is generally advantageous not to split fragments across data storage subsystems that can be operated in parallel.

Figure 2:
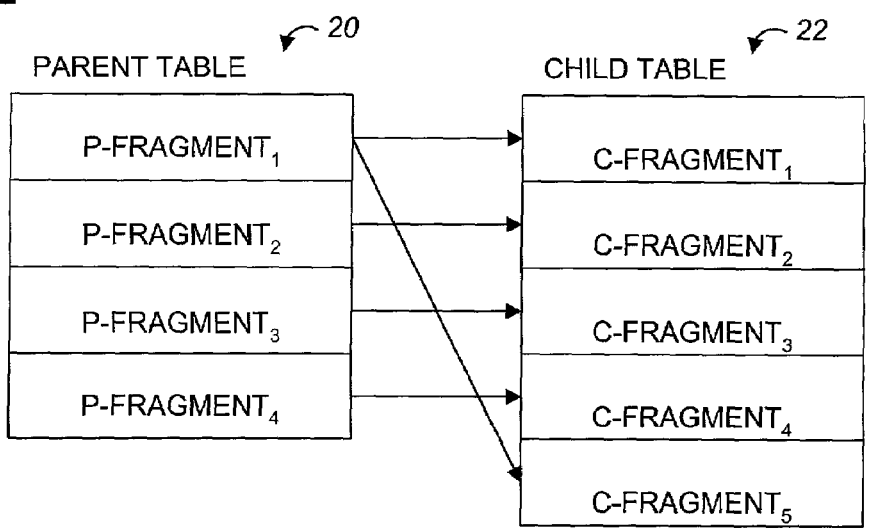
FIG. 2 is a schematic diagram of a parent table and a child table fragmented in accordance with the present invention.

Illustrated in FIG. 2 is a parent table 20 and a referencing child table 22. The child table has been fragmented using a correlated fragmentation scheme. As illustrated, child table 22 has more fragments than parent table 20; however, the number of fragments defined by a particular fragmentation scheme may be the same for both parent and child table, or the parent table may have more or fewer fragments than the child table does.

Figure 3:
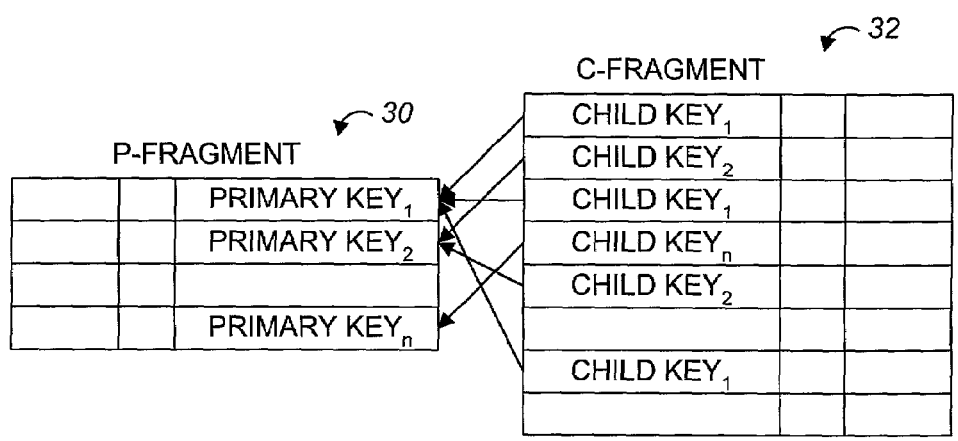
FIG. 3 is a schematic diagram of a parent table fragment and a child table fragment in accordance with the present invention.

As illustrated in FIG. 3, the rows in a parent table fragment each have a parent key. The rows placed in a child table's fragment 32 each reference (by child key values) a particular row and therefore a particular one of the fragments of the parent table. The same child key value may be common to more than one row of a child table and, therefore, more than one row of a child table may refer to one parent row.

A correlated fragmentation scheme defines the fragmentation of a child table. The definition of the correlated fragmentation scheme includes a specification of a fragmentation key. Note that the "correlated fragmentation" scheme for a child table is equivalent to saying that a child table has been correlation fragmented. The fragmentation key is a key—the child key—of the child table, which references a parent key of a parent table. The parent table may be fragmented into parent fragments using any fragmentation scheme that discretely maps multiple instances of the same parent key value to the same fragment of the parent table. Or, if the parent key is guaranteed to be unique, e.g., because it is the primary key, then any fragmentation scheme can be used for the parent table. As has been mentioned, referential integrity between the parent table and child table is not required, and the parent key may be, but need not be, unique.

As a matter of definition in this specification, a "correlation fragmented" child table is a table that is fragmented such that a mapping can be defined between the fragments of the parent and child tables such that a well-defined M:N relationship exists between the fragment identifiers that is derived from the fragment definitions of those tables. It should be understood that in this specification the relationship between fragments and identifiers is assumed to be a one-to-one relationship.

With correlated fragmentation, it is possible to maintain automatically a well-defined correspondence between the fragment identifiers of the child table and the fragment identifiers of a parent table that contain rows with matching child and parent key values. That is, all child rows having a particular child key value will be stored in one or more well-defined fragments of the child table. In addition, correlated fragmentation guarantees that each such child fragment identifier can be mapped directly to a well-defined set of fragment identifiers of the parent table corresponding to fragments that contain rows with matching parent key values. Note that the technique of correlated fragmentation can guarantee such a well-defined mapping between child and parent fragment identifiers even when the child and parent keys are not foreign and primary keys or even unique keys.

As has been noted, with correlated fragmentation there will be a well-defined M:N relationship between M fragments of a parent table and N fragments of a child table. It is advantageous for the relationship to be 1:N when the fragmentation scheme provides more child fragments than parent fragments, so that no more than one parent fragment corresponds to any one child fragment, and for the relationship to be M:1 when the fragmentation scheme provides more parent fragments than child fragments.

As can be seen most directly in the case of a 1:N relationship—in which each parent fragment is referenced by N child fragments—when any form of fragment elimination is applied to a parent table to produce a reduced set of parent fragments, that reduced set can be used directly to determine a reduced set of child fragments. Generally, with correlated fragmentation, the elimination of parent fragments can be propagated to yield fragment elimination of the corresponding child table, and the elimination of child fragments can be propagated to a parent table. Fragment elimination can thus provide very substantial performance improvements.

An application of correlated fragmentation to fragment elimination may be seen in the following example, using SQL-like statements that are abbreviated and simplified for purposes of illustration.

---

CREATE TABLE T1 (month char(10), table_T1_key int, . . .)
FRAGMENT BY EXPRESSION
    month = "January" in fragment_1,
    month = "February" in fragment_2,
    . . .
    month = "December" in fragment_m;

---

This statement defines a fragmentation definition for the parent table T1, and creates m=12 fragments in the parent table T1, one for each month of the year. Attributes of the fragmentation definition include a fragmentation scheme type (in this case, expression), and a fragmentation column (in this case, the month column). The fragmentation definition of the parent table is not constrained by correlated fragmentation. The parent table could be defined by any direct fragmentation method such as hash, range, expression, round robin or random fragmentation.

The following statement creates a fragmented child table T2 with a correlated fragmentation scheme that provides n child fragments for each referenced parent fragment in table T1.

```
CREATE TABLE T2
(
...
table_T2_key int CORRELATED WITH T1.table_T1_key;
...
)
FRAGMENT BY CORRELATION IN fragment_list1
[WITH ORPHANS IN fragment_list2];
```

Note that the child and parent keys are permitted to be composite keys with a corresponding number of columns, in the same sense that traditional corresponding foreign and primary keys can also be composite. Fragment_list1 and fragment_list2 arguments are lists of fragments that can be specified by an explicitly recited list, by a reference to a named object that is equivalent to a list of fragments, by a list of physical storage locations, or by any other mechanism that can yield a specific list of fragments. By use of a FRAGMENT BY CORRELATION statement, the fragmentation of a child table is made dependent on the fragmentation definition of a parent table.

Two aspects of the FRAGMENT BY CORRELATION clause may be noted. First, an actual key of the parent table is identified in one or more column definitions of a child table. This is done because correlated fragmentation may refer to a parent key that is not a primary key or even a unique key and, therefore, the parent key must be explicitly declared for use by correlated fragmentation. Second, notice that the definition of the correlated fragmentation of the child table specifies the name of the column of the child table, table_T2_key, whose child key values refer to the parent key values in the T1.table_T1_key column.

The column definition of the child key establishes the correlated fragmentation relationship between the child and parent tables. The "FRAGMENT BY CORRELATION" clause in the definition of the child table establishes that the fragmentation definition of the child table is being made dependent upon a parent table.

Figure 6:
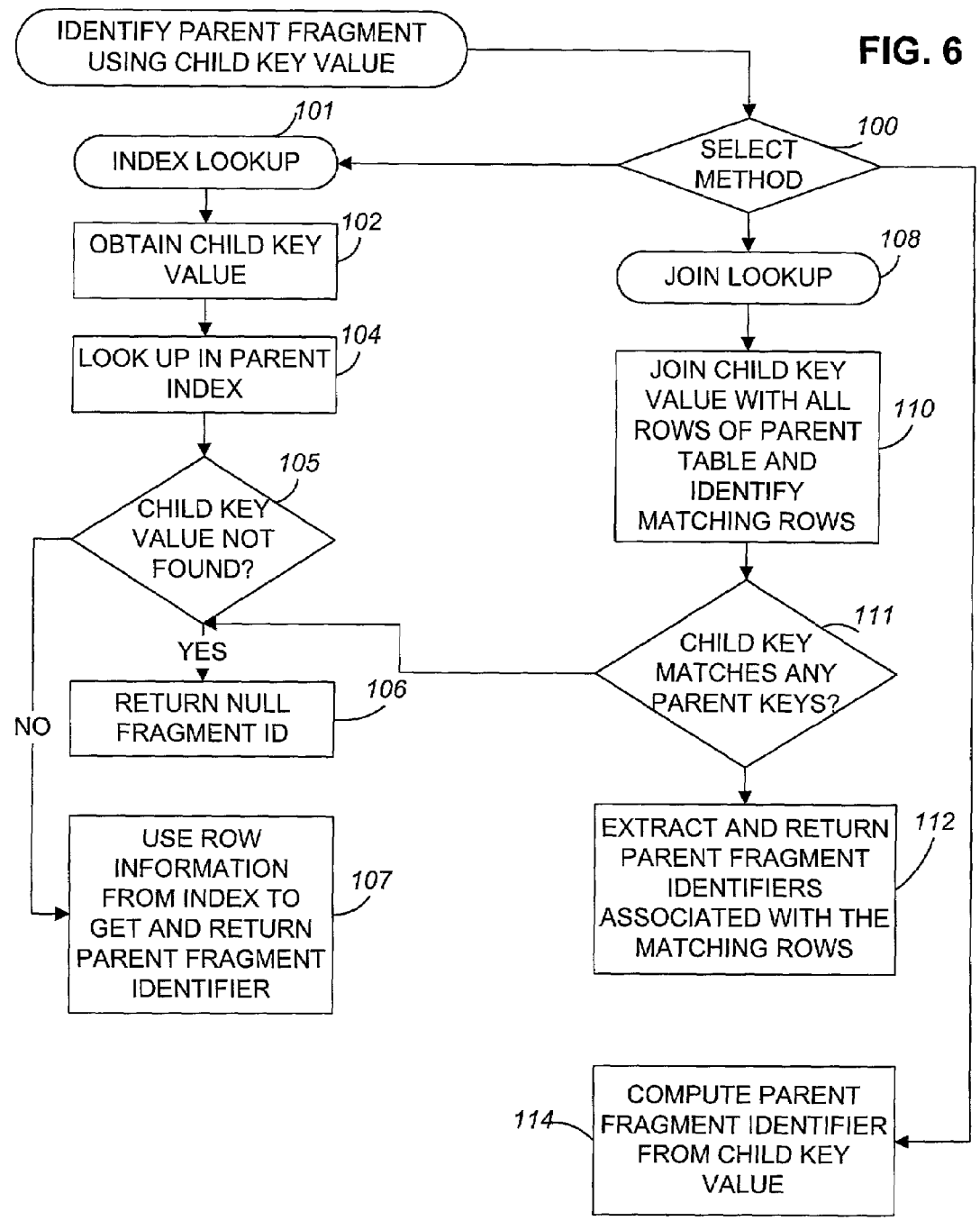

Correlated fragmentation need not enforce the requirement that a parent record exists whose parent key corresponds to the child key of a child record. The enforcement of such a requirement is traditionally enforced by the definition of a referential integrity constraint upon a child table. By contrast to such an integrity constraint, correlated fragmentation can allow "orphan" child records to exist. That is, the specified child column, table_T2_key, contains references to the values of the specified parent table column, table_T1_key, but a record of a parent table is not required to exist for each value of the child key, table_T2_key. Records of the child table whose child keys do not match the parent keys of an existing record in the parent table are called orphan child records. Sometimes, the parent fragment identifier that corresponds to a given child key value can be calculated for a given orphan child record based upon a computation on the child key record, as defined in step 114 of FIG. 6. In cases, when such a calculation of a parent fragment identified is not possible, the parent fragment identifier of an orphan child record is statically defined to be that of a well-defined, "foster parent" fragment identifier of the parent. In some implementations of correlated fragmentation, it is acceptable to define a "foster parent" fragment identifier to be the NULL value, indicating that a corresponding parent record does not exist for a given child record. Step 106 of FIG. 6 is defined to return the NULL value as the defined "foster parent" fragment identifier when a corresponding parent fragment identifier is not found for a given child key value.

Records of the child table whose child key values can be correlated to parent key values of existing or potential records in the parent table are fragmented into the fragment_list1 as specified in the definition of the child table. Records of the child table whose key values cannot be matched to parent key values of existing or potential parent table records are fragmented into fragment_list2. Unless otherwise specified, references to the "number of child fragments" in the following discussion refers to the number of child fragments in fragment_list1.

The database system may enforce a rule that each fragment of a particular table must be stored in a database storage space that is separate from the database storage spaces (FIG. 1, 206a–206e) used for all other fragments of the table, and that database storage spaces be physically located so that each may be scanned without resource contention from scans performed simultaneously on other database storage spaces. With such a scheme, the terms of the form "fragment_x" in the preceding SQL-like statements may refer to database storage spaces to which the fragments are assigned, and the database system may implicitly define the correspondence of each named child fragment to a given parent table fragment for purposes of controlling the extent to which the storage spaces of the corresponding child and parent fragments are co-located. Specifically, the system could implicitly choose to place fragments of the child table in those storage spaces that are physically closest to the storage spaces of the corresponding parent fragments. However, this particular and advantageous mapping of fragments to storage objects is not required. Many effective ways of mapping fragments to storage spaces are known in the art, and correlated fragmentation is not limited to any particular ones of them.

The syntax above is merely illustrative. An alternative syntax could express the creation of a correlated fragmented child table T2 as follows.

```
CREATE T2 (... column definitions ...)
    FRAGMENT BY CORRELATION WITH (T1)
    WITH (Table_T2_key1 = Table_T1_key1,
        Table_T2_key2 = Table_T1_key2,
        ... Table T2_keyx = Table_T1_keyx)
    IN fragment_list 1 [WITH ORPHANS IN fragment_list2];
```

As is done with the previous illustrative CREATE statement, this statement can be used to create a correlation of the fragmentation of a parent and child table based upon a correspondence of identified child key and parent key values and thereby create a referentially fragmented child table.

To return to the subject of fragment elimination, when a query such as

```
SELECT   *   FROM   T1,   T2   where
    T1.table_T1_key=T2.table_T2_key      AND
    T1.month="January";
``` is executed, the database system can eliminate all but fragment_1 in table T1 through normal fragment elimination processing. Knowing that only fragment_1 of T1 needs processing, the database system can then determine that only the fragments of table T2 that refer to table T1's fragment_1 will need to be scanned and processed.

Similarly, in situations where normal fragment elimination processing allows the elimination of child table fragments, the correspondence between parent and child table fragments created through a correlated fragmentation scheme will permit, as a consequence, the elimination of parent table fragments from query processing operations. Thus, propagation of fragment elimination can occur in both directions—from parent table to child table, and from child table to parent table—when correlated fragmentation is used. In conventional database systems, propagation of fragment elimination has been practical only when a predicate exists on a joining column. In such cases, the predicate is propagated from one table to the other and the application of that predicate against the second table may indirectly result in fragment elimination being possible for that second table. Correlated fragmentation allows fragmentation elimination to be applied to a child table even when a predicate cannot be propagated across a join predicate, as described in the previous example in which tables T1 and T2 were joined, but where a predicate was not specified against either of the columns involved in the join.

Figure 4:
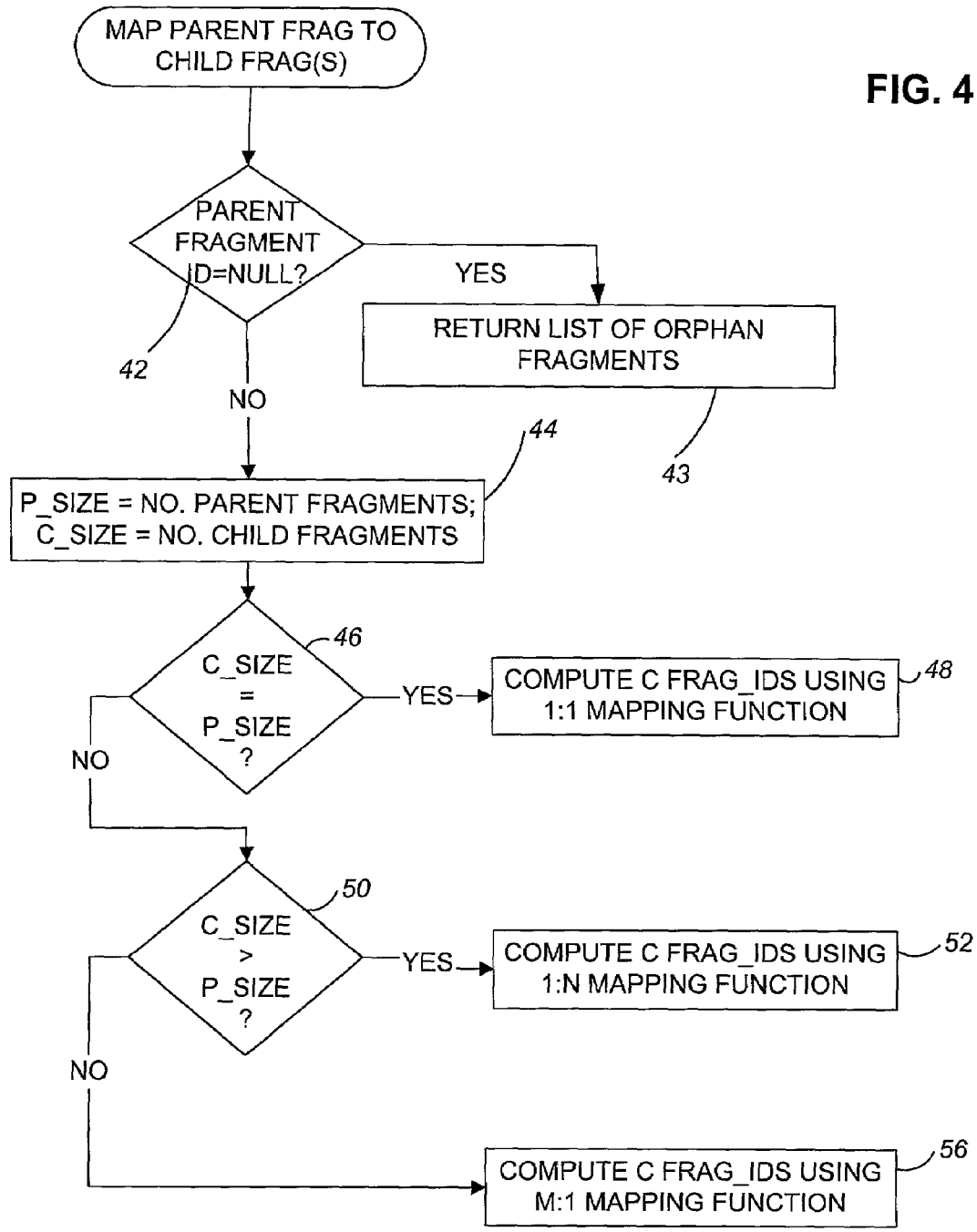
FIGS. 4–7 and 8A–8C are flow charts of methods of the present invention.
Figure 5:
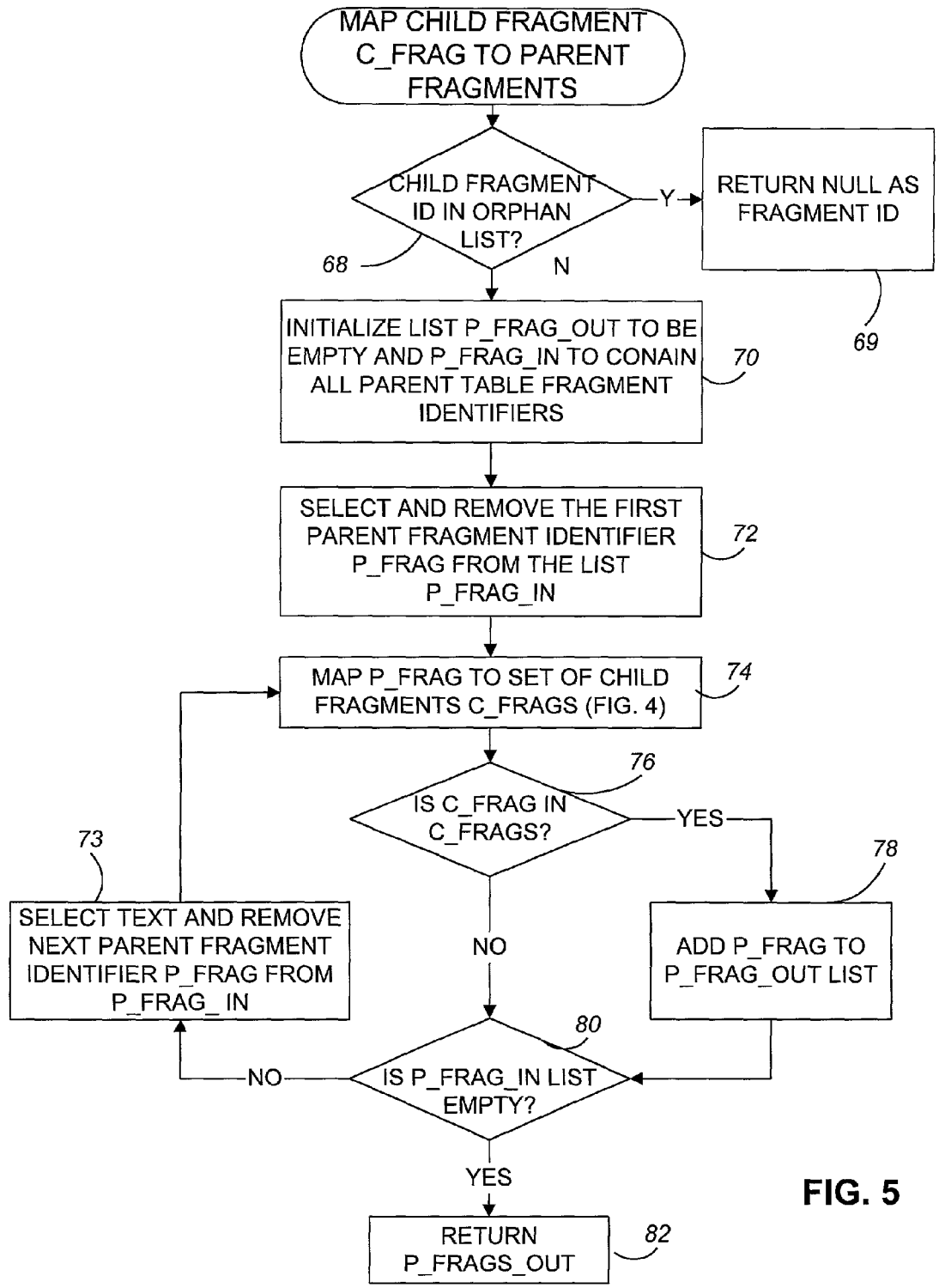

As illustrated in the flow chart of FIG. 4, a correlated fragmentation scheme defines a mapping from all fragments in the parent table to the corresponding fragments in the child table. The mapping is reversible; that is, from a parent fragment it is possible to compute a set of child fragments (FIG. 4) and from a child fragment it is possible to compute a set of parent fragments (FIG. 5).

A variety of mapping functions can be used to define the correspondence between parent and child fragments. Regardless which function is chosen, the net result is that logically a list is created that maps a given parent fragment identifier to a well-defined set of one or more child fragment identifiers. Conversely, given a specific child fragment identifier, a well-defined set of one or more parent fragment identifiers can be identified. Such a correspondence list can actually be created or the correspondence between child and parent fragment identifiers can be calculated on demand. FIGS. 4 and 5 illustrate one advantageous, well-defined mapping between child and parent fragment identifiers. Other effective methods of establishing a well-defined mapping between two sets of identifiers are known and correlated fragmentation is not limited to any particular one of them.

Although a variety of algorithms can be used as mapping functions, the range of algorithms that can be used for a particular parent table and a particular child table is limited by the number M of parent fragments and the number N of child fragments, as discussed below. In the following discussion, mapping functions will be characterized by a ratio of either M:1 or 1:N, where M is the number of parent fragments and N is the number of child fragments. FIG. 4 is a flow diagram of a method for computing a set of child fragment identifiers for a given parent fragment identifier. FIG. 4 illustrates how a set containing one or more child fragment identifiers is derived that correspond to a given parent fragment identifier. In FIG. 4, step 42, if a parent fragment does not exist, then the result set of child fragment identifiers is defined in FIG. 4, step 43 to be the set of fragment identifiers defined by the WITH ORPHANS clause of the child table definition. If a WITH ORPHANS clause was not provided for the child table, then the NULL child fragment identifier is returned by the algorithm illustrated in FIG. 4. In such a case when a NULL child fragment identifier is returned, whatever database operation that had originated that specific need for the mapping of a NULL parent fragment identifier to a child fragment would be failed as a prohibited operation.

If the parent fragment identifier in step 44, FIG. 4 is not NULL, then the number P_size of parent table fragments and the number C_size of child table fragments is determined (step 44). If the number of parent table fragments is equal to the number of child table fragments (decision step 46), the set of child fragment identifiers (each child fragment identifier being a number in the range of 1 to C_size, inclusive) would contain a single child fragment identifier that could be calculated using a 1:1 mapping function (step 48). One possible 1:1 mapping function would compute the child fragment identifier simply as the parent fragment identifier.

If the number of child table fragments is greater than the number of parent table fragments (decision step 50), the set of child table fragments may be computed using a 1:N mapping function (step 52). One possible 1:N mapping function would compute a set of child fragment identifiers that satisfy the function: parent_fragid=(child_fragid mod p_size) +1, such that c_size is used as the upper bound for child_fragid. Otherwise, if the number of parent table fragments is greater than the number of child table fragments, the set of child table fragments may be computed using a M:1 mapping function (step 56). One possible M:1 mapping function would compute the child fragment identifier by using the function: child_fragid=(parent_fragid mod c_size)+1.

Although the method shown in FIG. 4 decides which mapping function to use each time a parent fragment is mapped to a set of child fragments, this is not required, and typically the mapping function to be used for a particular pair of parent and child tables will be chosen once prior to the first mapping of a parent fragment to a set of child fragments.

FIG. 5 is a flow chart of a computer-implemented method of identifying a set of parent fragments from a given child fragment C_FRAG. In step 68, if C_FRAG is one of the fragments designated to containing orphan child records, then the NULL parent fragment identifier is returned from step 69. Otherwise, an output list of parent fragment identifiers is initialized (step 70). Next, a first parent fragment P_FRAG is selected (step 72). Then P_FRAG is mapped to a set of child fragments C_FRAGS using, for example, the method of FIG. 4 (step 74). If C_FRAG is in C_FRAGS (decision step 76), the identifier of P_FRAG is added to the list of parent fragment identifiers (step 78). If more parent fragments remain to be considered (decision step 80), a next parent fragment P_FRAG is selected (step 73) and steps 74, 76, and 78 are repeated until all parent fragments have been considered (decision step 80). The resulting list of parent fragment identifiers, representing the set of parent fragments corresponding to C_FRAG, is then returned (step 82). The method shown in FIG. 5 is illustrative and does not exhaust the ways in which a parent fragment identifier can be computed from a child fragment identifier.

FIG. 6 illustrates a computer-implemented method of identifying a parent fragment identifier given a child key value. This mapping of a child key value to a parent fragment identifier is an important step in the process of inserting or updating a row in a child table that is referentially fragmented. The method shown in FIG. 6 is illustrative and does not exhaust the ways in which a parent fragment identifier may be found. Having multiple alternatives available, the database system may select a method (step 100) based, for example, on database statistics maintained in the system catalogs. If an index lookup is selected (method 101), the system obtains the child row's child key value (step 102) and identifies a parent row by looking up that key value in an index on the parent key referenced in the correlated fragmentation definition of the child table (step 104). Note that this method is only appropriate if such an index exists for the parent table. If a parent row is not found in step 105, then the NULL fragment ID is returned in step 106. If a parent row is found in the index, the fragment identifier of the identified parent row is then identified and returned (Step 107) using the row location information that is associated with the key value in the index entry that was found during the index lookup.

If a join lookup method is selected (method 108), the database system joins the selected child key value with the parent key values in all of the rows of the parent table and identifies a set of one or more matching rows from the parent table (step 110). If the matching parent rows are found (step 114), the fragment identifiers associated with that set of matching parent rows are extracted in step 112. The join alternative is advantageous in situations in which matches must be found for a substantial number of child rows.

A further alternative is to compute the parent table fragment identifier from the child key value (step 114). This may be done, for example, when the parent table is fragmented on parent key values or on a function of parent key values. In such a case, the fragmentation definition of the parent table can be applied to the child key values to compute the corresponding fragment identifiers for the parent table.

Figure 7:
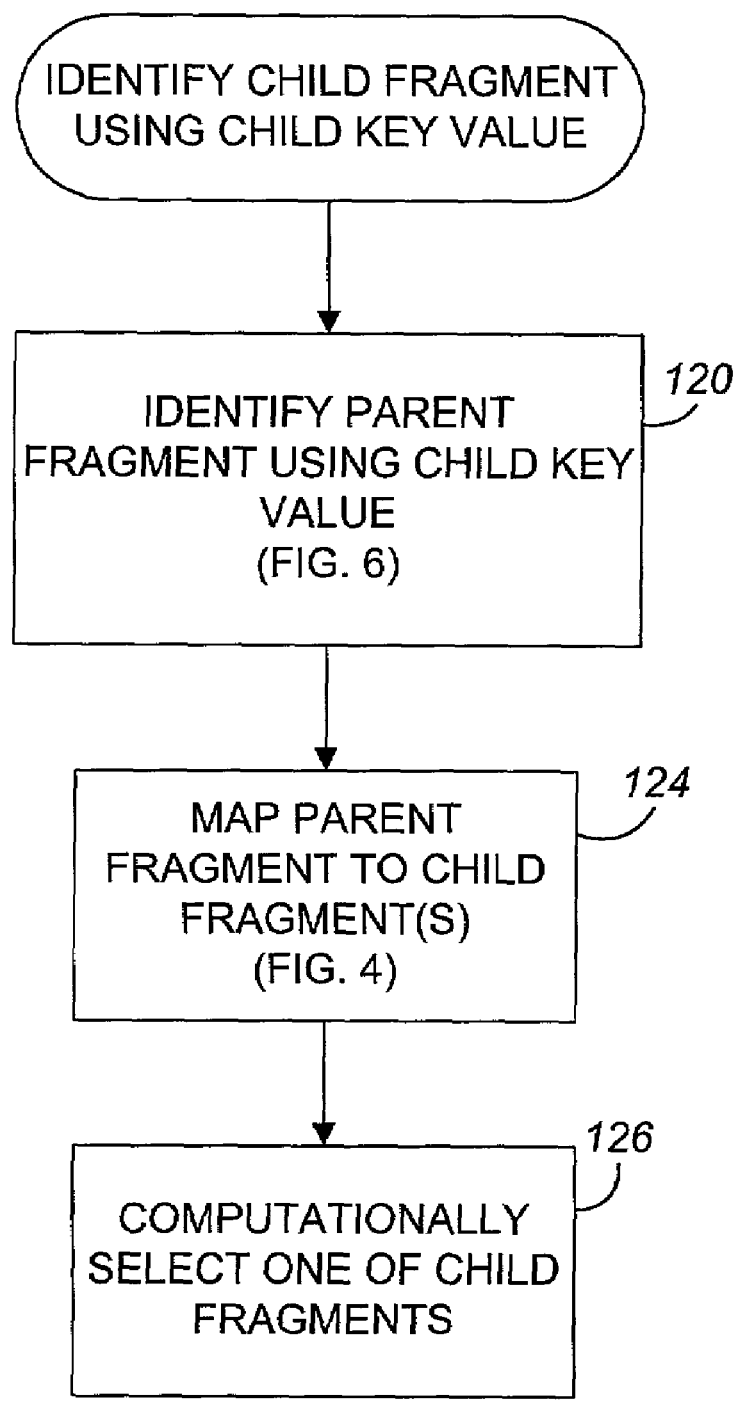

FIG. 7 illustrates a computer-implemented method of identifying a child fragment identifier that may be used during row insertion and row update operations to enforce the relationship between the parent and child fragments. When a new child record is inserted, the process illustrated in FIG. 7 is applied to the child key to determine a fragment identifier, where the child record will be inserted. When the child key of a child record is updated, the identifier of the current fragment containing the child record is designated as the Current_Child_Fragment_Identifier. The process illustrated in FIG. 7 is applied to the new value of the child key to yield a New_Child_Fragment_Identifier. If the New_Child_Fragment_Identifier is different from the Current_Child_Fragment_Identifier, then the child record is deleted from the fragment identified by Current_Child_Fragment_Identifier and inserted into the fragment identified by New_Child_Fragment_Identifier. In the process of identifying the fragment in which any given child row is to be stored, the fragment identifier of the parent fragment whose parent key matches the child record's child key value is identified using, for example, any of the methods of FIG. 6 (step 120). As has been mentioned, the parent row need not necessarily be read for it to be identified sufficiently to allow the parent fragment identifier to be obtained. Note that the most appropriate method of identifying parent fragment identifiers given one or more child key values (see FIG. 6) depends on the number of key value lookups that are needed. The choice of method, however, is a performance optimization choice and a number of methods for evaluating the best choice for a given circumstance are known. An implementation of correlated fragmentation can be based on any of those choices for accomplishing a mapping of a given key value to one or more fragment identifiers of a parent table.

Once a parent fragment identifier is obtained, that identifier is then mapped to a set of child fragment identifiers using, for example, the method of FIG. 4 (step 124). One child fragment from the set of child fragments is then computationally selected (step 126). The step 126 of computationally selecting a child fragment identifier when more than one potential choice exists may be done using a variety of methods. With a key value method, the child key value of the child row is mapped to a fragment number of the child table by a predefined mapping function that generates a unique fragment number for each child key value. In a hash variant of a key value method, the child key value is hashed to a number in a range the size of the number of candidate child fragments and then mapped one-to-one to a candidate child fragment identifier. In a range variant of a child key method, the child key value range is divided into segments that are assigned to fragment identifiers.

With a round robin method, the least recently used candidate is used for new row insertion. With a random number method, a candidate is selected for new row insertion through use of a random number generator. With both round robin and random number methods, all candidates must be scanned for other operations. With a user-defined method, a user—typically, a database administrator—provides a program module or other definition of a computation that selects one fragment identifier from the set of candidates as the home fragment for the child row. The method to be used is specified in the system catalog for the database, as are the fragmentation scheme, the numbers of fragments for the tables, and other specifications of the database.

When a new record is inserted into a fragment of a parent table, any orphan child records of child tables that refer to that parent row must be moved from their current orphan child fragments into the fragment of the child table that corresponds to the parent fragment identifier of the newly inserted parent record. Note that such movement of child records is not needed in cases when referential integrity is combined with correlated fragmentation. Alternately, when the step 114 of FIG. 6 is able to compute a parent fragment identifier for any given value of a child key then orphan records will be allowed, but will already have been placed into the correct child fragment that will correspond to the parent fragment identifier of a future parent record with a matching parent key.

In the case when a child record needs to be moved, each child table that refers to the parent table through correlated fragmentation must be examined to determine if any orphan child records exist that can be associated with the newly inserted parent record. For each such child table, the child key values of orphan records are compared against the parent key of the newly inserted parent record. The matching of the child keys of orphan records to the parent key of the newly inserted parent record can be accomplished by any of the traditional database record joining techniques. Any orphan record with a child key matching the parent key of the newly inserted parent record is then deleted from its current orphan fragment and and is reinserted into a new child fragment. The insertion of the child record into a new child fragment can be accomplished using the technique described in FIG. 7.

Figure 8A:
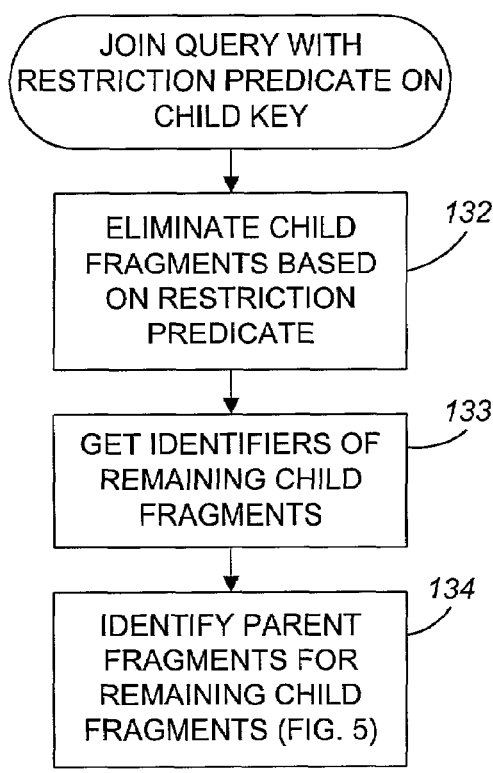
Figure 8B:
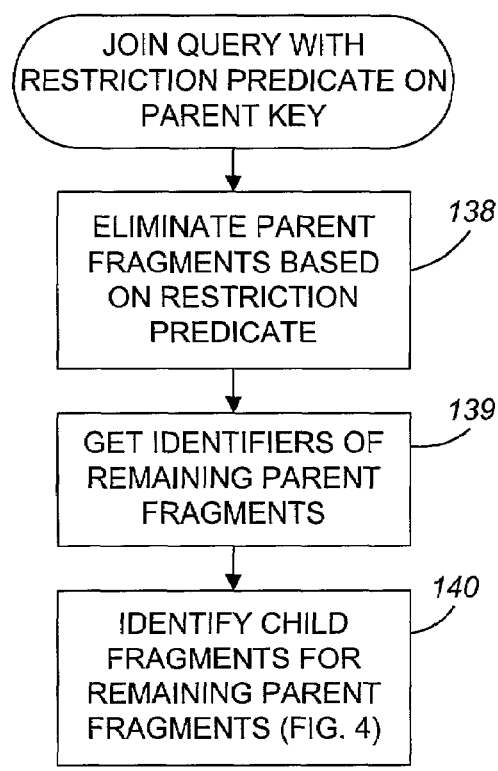
Figure 8C:
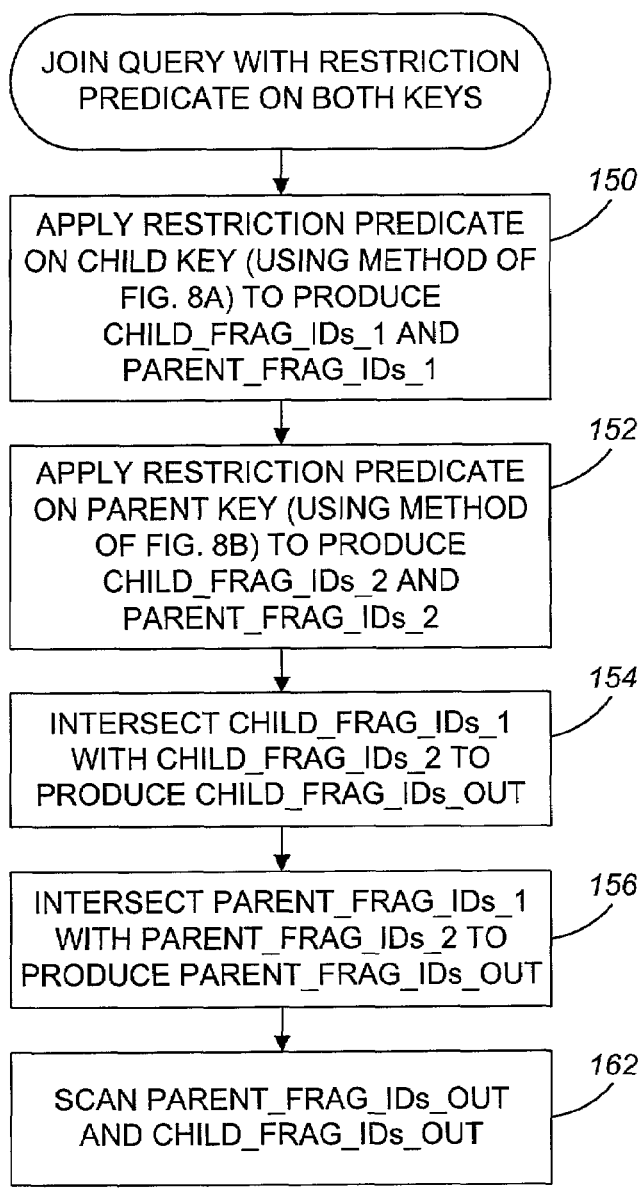

As illustrated in FIGS. 8A–8C, correlated fragmentation may be used during fragment elimination for join queries having a join predicate between parent and child keys. The computer-implemented methods illustrated in FIGS. 8A–8C are illustrative and do not exhaust the ways in which correlated fragmentation can be exploited in fragment elimination.

The fragment elimination illustrated in FIGS. 8A–8C is solely based on the use of the parent-child fragment mappings that result from correlated fragmentation. Additional fragment elimination can be obtained by propagating predicates on a joining column across a join predicate to be applied to the table containing the joining column. Any fragment elimination that can be obtained from such indirect means can be used in addition to the direct fragment elimination that is illustrated in FIGS. 8A–8C.

First, referring to FIG. 8A, consider the case of a query with a restriction predicate on the child table. A restriction predicate on the child table allows normal single-table fragment elimination to be performed on the child table, which may reduce the number of fragments of the child table to be scanned (step 132). After normal, single-table fragment elimination is applied to the child table, a set of child fragment identifiers is obtained for the child fragments that will contain the rows of the child table that must be scanned to produce data rows for the join (step 133). The parent fragments corresponding to the child table fragment identifiers are identified using, for example, the method of FIG. 5 (step 134). Only the identified parent fragments and the child fragments which satisfy the restriction predicate are scanned.

Referring to FIG. 8B, in the case of a query with a restriction predicate on the fragmentation key of the parent table, the restriction predicate on the fragmentation column of the parent table allows normal, single-table fragment elimination to be performed on the parent table to eliminate fragments to be scanned on the parent table (step 138). If the child table contains orphan fragments, then the NULL parent fragment ID is added to the list of parent fragment IDs that is produced by step 139 in FIG. 8B. Once the remaining parent fragment identifiers have been identified (step 139), a corresponding set of child fragments is identified using, for example, the method of FIG. 4 (step 140) for each of the parent fragment identifiers. Then, only the identified child fragments and the remaining parent fragments are scanned.

Referring to FIG. 8C, the handling of a query with restriction predicates on both the child and parent tables will be described. The restriction predicate is applied to the child key in step 150 using the method illustrated by FIG. 8a to produce two lists of fragment identifiers: Child_Frag_IDs_1 and Parent_Frag_IDs_1. Then, the restriction predicate is applied to step 152 to the parent key using the method illustrated by FIG. 8b to produce two lists of fragment identifiers: Child_Frag_IDs_2 and Parent_Frag_IDs_2. Then, in step 154, the child fragment identifier lists produced by steps 150 and 152, namely Child_Frag_IDs_1 and Child_Frag_IDs_2, are intersected to produce Child_Frag_IDs_Out. In a similar fashion, in step 156, the parent fragment identifier lists produced by steps 150 and 152, namely Parent_Frag_IDS_1 and Parent_Frag_IDs_2, are intersected to produce Parent_Frag_IDS_Out. Finally, the child and parent fragment identifiers represented by Child_Frag_IDs_Out and Parent_Frag_IDs_Out are scanned to produce child and parent rows for the query being processed.

Figure 9:
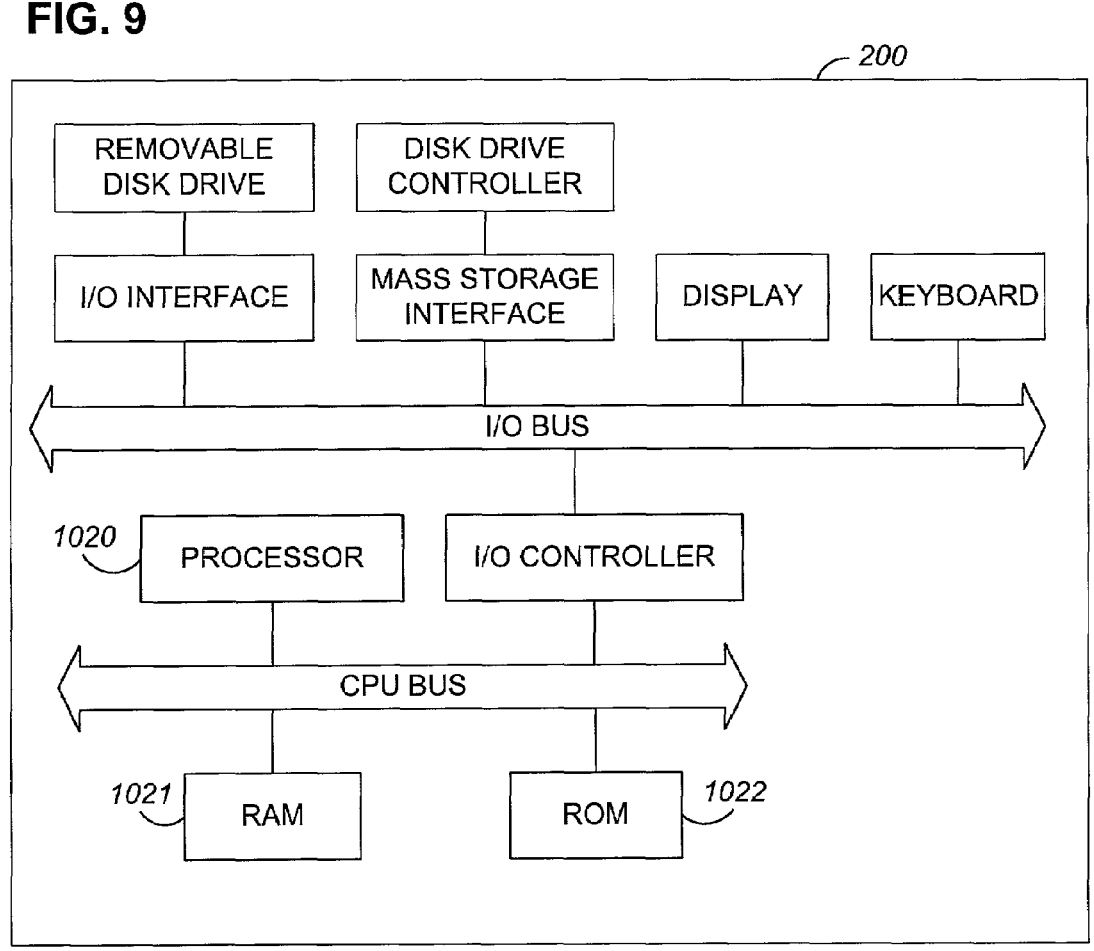
FIG. 9 is a block diagram of a computer and computer elements suitable for use in the computer system platform of FIG. 1.
Figure 9:
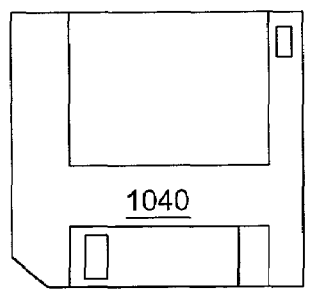

Shown in FIG. 9 is a block diagram of a computer 202 suitable for use in the computer system platform described earlier with reference to FIG. 1. The invention may be implemented in digital electronic circuitry or in computer hardware, firmware, software, or in combinations of them. Apparatus of the invention may be implemented in a computer program product tangibly embodied in a machine-readable storage device for execution by a computer processor; and method steps of the invention may be performed by a computer processor executing a program to perform functions of the invention by operating on input data and generating output. Suitable processors 1020 include, by way of example, both general and special purpose microprocessors. Generally, a processor will receive instructions and data from a read-only memory 1022 and/or a random access memory 1021. Storage devices suitable for tangibly embodying computer program instructions include all forms of non-volatile memory, including by way of example semiconductor memory devices, such as EPROM, EEPROM, and flash memory devices; magnetic tapes; magnetic disks such as internal hard disks and removable disks 1040; magneto-optical disks; and CD-ROM disks. Any of the foregoing may be supplemented by, or incorporated in, specially-designed ASICs (application-specific integrated circuits).

A number of embodiments of the invention have been described. Nevertheless, it will be understood that various modifications may be made without departing from the spirit and scope of the invention. Accordingly, other embodiments are within the scope of the following claims.

What is claimed is:

1. A system for eliminating fragments in the evaluation of a query that references both a parent and a child table in a relational database, comprising a processor configured for:

establishing a correlated fragmentation scheme using key values to define a M:N relationship between M fragments of a fragmented parent table and N fragments of the child table, the key being a child key for the child table and a parent key for the parent table, a child key value representing a reference to a parent row in the parent table;

obtaining a set of child key values for the child rows satisfying the query predicate;

using the set of child key values to identify a set of parent table fragments, the set of parent table fragments being all the fragments of the parent table having a row that is referenced by any of the set of child key values;

using any predicate or other qualifier on the parent table to further reduce the set of parent table fragment identifiers through the process fragment elimination; and using the identified set of parent table fragments and the correlated fragmentation scheme to identify a set of child table fragments to be scanned; and using the identified set of parent table fragments as the basis for a scan of the parent table.

2. Computer readable storage medium to execute code to eliminate fragments in the evaluation of a query that references both a parent and a child table in a relational database, comprising instructions to:

establish a correlated fragmentation scheme using key values to define a M:N relationship between M fragments of a fragmented parent table and N fragments of the child table, the key being a child key for the child table and a parent key for the parent table, a child key value representing a reference to a parent row in the parent table;

obtain a set of child key values for the child rows satisfying the query predicate; use the set of child key values to identify a set of parent table fragments, the set of parent table fragments being all the fragments of the parent table having a row that is referenced by any of the set of child key values;

use any predicate or other qualifier on the parent table to further reduce the set of parent table fragment identifiers through the process fragment elimination;

use the identified set of parent table fragments and the correlated fragmentation scheme to identify a set of child table fragments to be scanned; and use the identified set of parent table fragments as the basis for a scan of the parent.

3. A computer implemented method for eliminating fragments in the evaluation of a query that references both a parent and a child table in a relational database, comprising:

establishing a correlated fragmentation scheme using key values to define a M:N relationship between M fragments of a fragmented parent table and N fragments of the child table, the key being a child key for the child table and a parent key for the parent table, a child key value representing a reference to a parent row in the parent table;

obtaining a set of child key values for the child rows satisfying the query predicate;

using the set of child key values to identify a set of parent table fragments, the set of parent table fragments being all the fragments of the parent table having a row that is referenced by any of the set of child key values;

using any predicate or other qualifier on the parent table to further reduce the set of parent table fragment identifiers through the process fragment elimination; and using the identified set of parent table fragments and the correlated fragmentation scheme to identify a set of child table fragments to be scanned; and using the identified set of parent table fragments as the basis for a scan of the parent table.

* * * * *